(12) United States Patent  
Roth et al.

(10) Patent No.: US 9,395,202 B2  
(45) Date of Patent: Jul. 19, 2016

(54) METHOD AND SYSTEM FOR PROVIDING INFORMATION IN A VEHICLE

(71) Applicant: Harman Becker Automotive Systems GmbH, Karlsbad (DE)

(72) Inventors: Hans Roth, Karlsruhe (DE); Christoph Reifenrath, Erfstadt (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 0 days.

(21) Appl. No.: 14/522,799

(22) Filed: Oct. 24, 2014

(65) Prior Publication Data

US 2015/0168172 A1     Jun. 18, 2015

(30) Foreign Application Priority Data

Dec. 18, 2013   (EP) ..................................... 13005891

(51) Int. Cl.  
*G01C 21/34* (2006.01)  
*G01C 21/36* (2006.01)

(52) U.S. Cl.  
CPC ........ *G01C 21/3476* (2013.01); *G01C 21/3469* (2013.01); *G01C 21/3673* (2013.01); *G01C 21/3679* (2013.01); *G01C 21/3682* (2013.01)

(58) Field of Classification Search  
CPC ................................ G01C 21/36; G01C 21/34  
USPC ....................................................... 701/123  
See application file for complete search history.

(56) References Cited

U.S. PATENT DOCUMENTS

| | | | |
|---|---|---|---|
| 6,484,088 B1 * | 11/2002 | Reimer ........................ 701/123 |
| 7,406,448 B2 * | 7/2008 | Leberknight ................ 705/400 |
| 8,738,277 B1 * | 5/2014 | Kurosawa et al. ............ 701/123 |
| 8,744,669 B1 * | 6/2014 | Peraza ......................... 701/32.4 |
| 9,067,571 B2 * | 6/2015 | Matsunaga | |
| 2003/0195676 A1 * | 10/2003 | Kelly et al. ...................... 701/29 |
| 2006/0095390 A1 | 5/2006 | Leberknight | |

(Continued)

FOREIGN PATENT DOCUMENTS

| | | |
|---|---|---|
| DE | 10105175 A1 | 8/2002 |
| DE | 102005016006 A1 | 10/2006 |
| FR | 2941313 A1 | 7/2010 |

OTHER PUBLICATIONS

European Search Report for 13005891.0, May 26, 2014.

*Primary Examiner* — Thomas Tarcza  
*Assistant Examiner* — Alex C Dunn  
(74) *Attorney, Agent, or Firm* — Artegis Law Group, LLP (57) ABSTRACT

A method for providing information in a vehicle, comprising:
  Outputting a fuel amount in the fuel tank of the vehicle,
  Outputting a volume of the fuel tank of the vehicle,
  Reading data on gas stations from a database, wherein the data have an identification for each gas station and/or a geographic position of each gas station and wherein the data have a price associated with the particular gas station for a fuel for the vehicle,
  Determining a distance value for each gas station, wherein the distance value is determined from map data,
  Determining driving cost based on consumption of the fuel for the distance value,
  Determining cost of fueling for each gas station based on the fuel amount and the volume and the price of the fuel,
  Determining total cost based on the driving cost and the cost of fueling, and
  Outputting a ranking of gas stations based on the total cost.

15 Claims, 4 Drawing Sheets

(56) References Cited

U.S. PATENT DOCUMENTS

| | | |
|---|---|---|
| 2007/0290039 A1* | 12/2007 | Pfleging et al. ............... 235/384 |
| 2009/0109022 A1 | 4/2009 | Gangopadhyay et al. |
| 2009/0204316 A1 | 8/2009 | Klampfl et al. |
| 2010/0198508 A1 | 8/2010 | Tang |
| 2013/0037165 A1* | 2/2013 | Okawachi et al. ................ 141/4 |
| 2013/0144811 A1* | 6/2013 | Padmalayam Narayana Kurup et al. ............................. 705/413 |
| 2015/0153195 A1* | 6/2015 | Burlingham et al. ......... 701/123 |

\* cited by examiner

| | D | N | A | P | S | FAV | R |
|---|---|---|---|---|---|---|---|
| GS₁ → | 0,1 km <1 min | ESSO | Hardtwald-Ostseite 69207 Sandhausen | 1,519 € | 0,00€ | | |
| GS₂ → | 4,1 km 5 min | AVIA | Mannheimer Landstraße 2 69207 Sandhausen | 1,449 € | 18,26€ | | 1 |
| GS₉ → | 5,5 km 8 min | ESSO | Eppelheimer Str. 41 66723 Plankstadt | 1,459 € | 16,88€ | * | 2 |
| GS₆ → | 6,3 km 10 min | SB | Eppelheimer Str. 78 69123 Heidelberg | 1,459 € | 14,99€ | | 3 |
| GS₇ → | 10,2 km 17 min | JET | Eppelheimer Str. 31-32 69115 Heidelberg | 1,459 € | 5,01€ | * | 4 |
| GS₁₃ → | 11,4 km 13 min | SB | Rosenstrasse 70 68535 Edingen Neckarhausen | 1,469 € | 2,66€ | | 5 |
| GS₅ → | 13,5 km 15 min | Shell | Vangerowstrasse 37 69115 Heidelberg | 1,469 € | 1,34€ | | 6 |

METHOD AND SYSTEM FOR PROVIDING INFORMATION IN A VEHICLE

The present invention relates to a method and a system for providing information in a vehicle.

The U.S. Pat. No. 8,116,972 B2 shows a system and method for determining a vehicle refueling strategy. A method for generating a fueling strategy that generally minimizes fueling costs for a specified route to be traveled by a vehicle during a multi-day time period includes, based on current and forecasted fuel prices for the multi-day time period, selecting at least one day during the multi-day time period on which to purchase fuel, selecting at least one fueling station along the route at which to purchase fuel for each selected day, and determining an amount of fuel to purchase at each selected fueling station.

The US 2010/0317365 A1 shows data services via receivers independent of navigation systems. A system and method for providing a suite of data services in non-navigation based electronic devices such as head units that provide similar levels of functionality to navigation-based systems are presented in US 2010/031765 A1. A non-navigation data system for providing data services in a mobile environment includes a data decoder for decoding a digital data stream from a digital audio radio transmission source, a location determining means for determining a current location of a mobile receiver receiving the digital data stream, a display for displaying data corresponding to the current location, and a plurality of static maps, wherein the data corresponding to the current location is overlaid at least over a portion of the static maps. In exemplary embodiments of the present invention, a method of providing a data service in a mobile environment without the need for a navigation system includes decoding a digital data stream from a digital audio radio transmission source, determining a current location of a mobile receiver receiving the digital data stream, displaying data corresponding to the current location, and overlaying the data corresponding to the current location over at least a portion of a plurality of static maps.

A device that has a position-determining unit for determining the actual position of a motor vehicle is known from DE 10 2011 102 913 A1. A wireless receiving unit receives data about energy types, and a determining unit determines reference-energy types from the types offered at an energy discharge point. Another determining unit determines the amount of energy supplied to the vehicle. An evaluation unit determines the cost for the supplied energy amount based on the position of the vehicle and the data about the types. A display unit displays the cost and/or amount of energy to a driver of the vehicle. An independent claim is also included for a method for determining the cost for energy quantity received by a motor vehicle.

The object of the invention is to improve a method for providing information.

Said object is attained by a method with the features of independent claim 1. Advantageous refinements are the subject of dependent claims and included in the description.

Accordingly, a method for providing information in a vehicle is provided. The method comprises the steps:

Outputting a fuel amount in the fuel tank of the vehicle.
Outputting a volume of the fuel tank of the vehicle.
Reading data on gas stations from a database, wherein the data have an identification for each gas station and/or a geographic position of each gas station and a price associated with the particular gas station for a fuel suitable for the vehicle.
Determining a distance value for each gas station, whereby the distance value is determined from map data.
Determining driving cost based on fuel consumption for the distance value.
Determining cost of fueling for each gas station based on the fuel amount and volume and price of the fuel.
Determining total cost based on the driving cost and the cost of fueling.
Outputting a ranking of gas stations based on the total cost.

The object of the invention further is an improved system for providing information.

Said object is attained by the system with the features of independent claim 15. Advantageous refinements are included in the description.

Accordingly, a system for providing information for a vehicle is provided. The system has a memory device and a display for displaying in the vehicle and a circuit. The circuit has an interface for connecting to the memory device and the display.

The circuit is configured to determine a fuel amount in the fuel tank of the vehicle.

The vehicle fuel tank volume is stored in the memory device. The memory device is, for example, a semiconductor memory. The volume is, for example, a value in liters or cubic decimeters.

The circuit is configured to read data on gas stations from a database. The data have the data have an identification for each gas station and/or a geographic position of each gas station. The data have for each gas station a price, associated with the particular gas station, for the fuel for the vehicle.

The circuit is configured to determine a distance value for each gas station. The distance value is determined from map data.

The circuit is configured to determine driving cost based on fuel consumption for the distance value.

The circuit is configured to determine cost of fueling for each gas station based on the fuel amount and the volume and price of the fuel.

The circuit is configured to determine total cost based on the driving cost and the cost of fueling.

The circuit is configured to determine a ranking of gas stations based on the total cost and for displaying on the display.

The embodiments described hereinafter refer to both the method and the system for providing information. Functional features of the system can be derived in this regard from the methods features.

According to one embodiment, a list with the ranking of gas stations may be displayed. The total cost for each gas station and/or savings for each gas station may be shown in the list.

According to one embodiment, each entry in the list has a time difference based on the distance value. The time difference may be calculated by dividing the distance value with the average speed on the way to the specific gas station.

According to one embodiment, a gas station with the lowest driving cost and/or the lowest distance value may be determined. The gas station with the lowest driving cost and/or the lowest distance value may be indicated in addition in the list.

According to one embodiment, a gas station may be determined from a favorites set. The gas station from the favorites set may be displayed in addition in the list. Alternatively only gas stations from the favorites set may be displayed in the list based on the ranking.

According to one embodiment, an input of a selection of a gas station from the list by a user may be determined. A driving route to the geographic position of the selected gas station may be calculated. Route guidance for the driving route to the gas station may be output.

According to one embodiment, a route from a starting point to a destination may be calculated. The distance value may be determined based on a detour, which arises due to the departure from the route to the particular gas station.

According to one embodiment, the starting point is based on the current position of the vehicle. According to one embodiment the destination is based on a user input. The user may input coordinates or an address to be translated into coordinates. According to one embodiment the destination is based on a recorded history of driven ways. Most frequently used ways may lead to a destination like "work" or "home". If the user is driving on such a way it is very likely that he is heading such a specific destination. Hence, to optimize the total cost, gas stations may be ranked based on a route calculated to the specific destination the user is currently heading to.

According to one embodiment, the fuel amount in the fuel tank may be monitored. The calculation of the route may be initiated, if the fuel amount in the fuel tank falls below a threshold. The route may be calculated automatically. The route may be calculated in the background, not visible to the user. The list may additionally have the destination based on the recorded history of driven ways.

According to one embodiment, a current position of the vehicle may be determined. The distance value may be determined based on a distance between the current position and the particular gas station.

According to one embodiment, the gas stations whose data are to be read may be determined before the reading of the gas station data. The determination of the gas station may occur in particular based on a comparison of the distance value for the particular gas station with a threshold. The determination of the gas station may occur in particular based on a remaining range based on the fuel amount. The determination of the gas station may occur in particular based on a gas station favorites set. The determination of the gas station may occur in particular based on a match between at least one fuel under offer of the particular gas station and the fuel suitable for the vehicle.

According to one embodiment, the vehicle may use two difference fuels. The vehicle may use gasoline and liquid gas as fuel. Each price for each fuel suitable for the vehicle may be retrieved with the read data on gas stations. According to one embodiment, the total cost of one rank is calculated based on at least two distance values for reaching at least two gas stations and at least two data of the at least two gas stations. It is possible to first fuel a smaller volume of a first fuel (gasoline) for reaching another gas station and second to fuel a larger volume of a second fuel (liquid gas) to optimize the total cost. A list entry of the one rank may be displayed having the at least two gas stations. According to one embodiment a mean time for fueling may be considered.

According to one embodiment, an image of a price sign of a gas station may be taken. The fuel price may be recognized in the image of the price sign. The price for the gas station may be sent to the database. An entry for the gas station in the database can be updated based on the detected price.

According to one embodiment, a time dependency of change of a fuel price may be determined for each gas station based on a history of the fuel price. The price associated with the particular gas station may be determined for the fuel based on a forecast using the determined time dependency. According to one embodiment, driving instructions may be output to the user based on the forecast. E.g. the price forecast predicts that the price will significantly fall after 6 o'clock p.m., so that the user should drive slower to reach the gas station afterwards and at the same time safe fuel due to conservative driving style.

According to one embodiment, statistic values are calculated of at least one of the driving cost, the cost of fueling, the total cost, the price, the distance value, the consumption and savings. Statistic data of the statistic values may be displayed to the user. The user may review e.g. the savings in a time dependent graph.

The previously described embodiments are especially advantageous both individually and in combination. In this regard, all embodiments can be combined with one another for further refinement. Some possible combinations are explained in the description of the exemplary embodiments in the figures. These possible combinations of the embodiments, depicted therein, are not definitive, however.

The invention will be described in greater detail hereinafter by exemplary embodiments using graphic illustrations.

Figure 1:
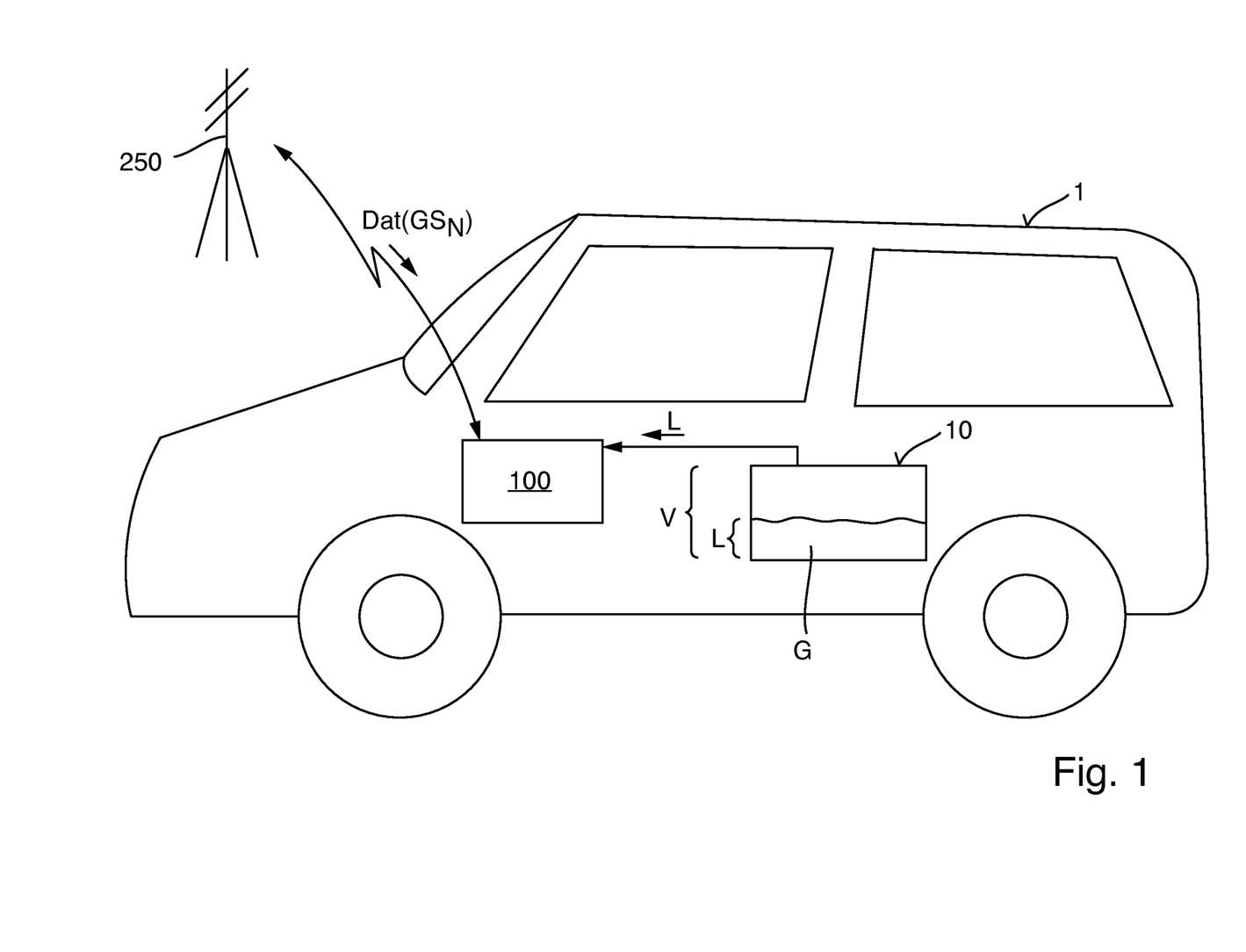
FIG. 1 shows a schematic illustration of a vehicle.

FIG. 1

A motor vehicle 1 is illustrated schematically in FIG. 1. Vehicle 1 may have a fuel tank 10 with the fuel G. Fuel G may be a conventional fuel, such as diesel, gasoline, or premium. The fuel G may include newer fuels, such as liquefied gas, hydrogen, or electric charge. Accordingly, the fuel amount L can be determined in liters or ampere-hours. Fuel tank 10 may be a tank for receiving liquid fuels G or a battery for storing an electric charge as fuel G.

The fuel amount L may be determined with use of sensors and transmitted to an electronic system 100 of vehicle 1. Fuel G, fuel amount L, and volume V of gas tank 10 are shown schematically in FIG. 1. The fuel amount L may be output in system 100. Likewise, the volume V of gas tank 10 may be output in system 100. The volume V of gas tank 10 may be output according to the employed fuel G, for example, in liters or ampere-hours.

Electronic system 100 may be connected to a mobile network 250 via a wireless interface. Electronic system 100 may be configured to read via the mobile network the data Dat on gas stations $GS_N$ from a database.

Figure 2:
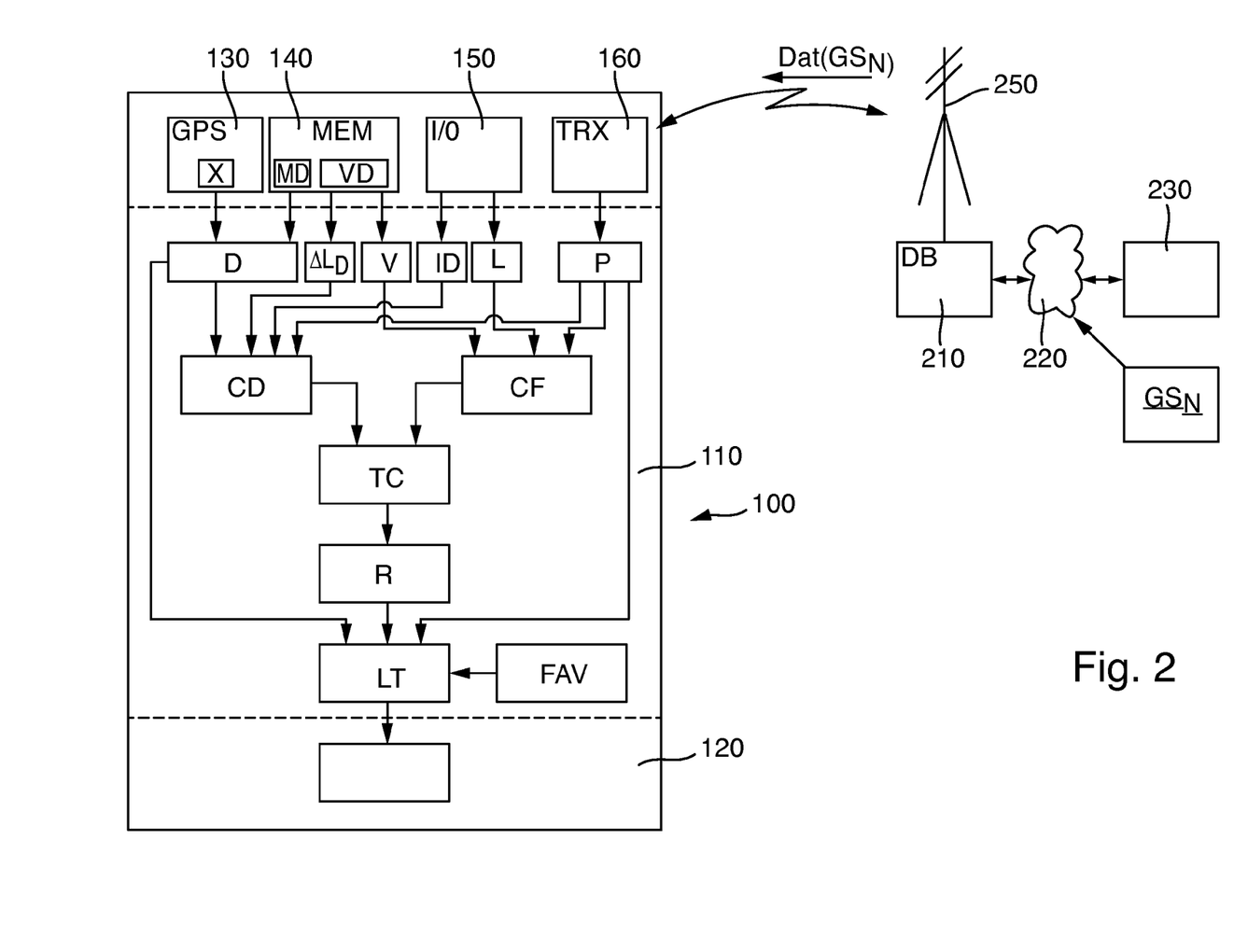
FIG. 2 shows a schematic illustration of a system.

FIG. 2

An electronic system 100 for a vehicle 1 is illustrated schematically in FIG. 2. System 100 may have an evaluation circuit 110 and/or a display 120 and/or a satellite receiver 130 for GPS signals and/or a memory 140 and/or an interface 150 to the vehicle electronics and/or a transceiver 160 for connecting to a mobile network 250. Electronic system 100 may be designed as a navigation system. System 100 may be connected to a mobile network 250 via a wireless connection. Mobile network 250 in the exemplary embodiment of FIG. 2 can be connected via the Internet 220 to a database 210, in which data on gas stations $GS_N$ are stored. Evaluation circuit 110 may be configured to request the data Dat on gas stations $GS_N$ via transceiver 160 and mobile network 250 and Internet 220.

A basic calculation procedure for fuel cost optimization will be described below. System 100 (navigation unit), the gasoline price database 230 of the German Bundeskartellamt

[Federal Cartel Office], and an on-board computer of vehicle 1 can provide incoming data Dat, P, and information D, $\Delta L_D$, V, ID, L in the embodiment of FIG. 2 or they can be determined in circuit 110.

First, a geographic region of interest for the optimization may be determined. The geographic region can be determined based on vehicle data and/or based on a travel route from a starting point to a destination and/or based on user instructions. The possibilities are explained by way of example in one embodiment of FIG. 3. In the exemplary embodiment of FIG. 2, the on-board computer may have information on the still available range. A geographic region can be calculated hereby which is still reachable for the driver with the available fuel tank level L. Next, the gas stations $GS_N$ reachable in the geographic region can be determined.

The implementation of a fuel card database and/or filter is advantageous for professional users. System 100 may be configured to take into account only gas stations that are appropriate for a fuel card. The information on the fuel card that is used may be input into system 100 via a specific app. Based on this, only gas stations associated with the fuel card may be output for making a selection.

System 100 may supply the necessary information D, $\Delta L_D$, V, ID, L to compile a gas station list LT. Gas station list LT is a listing of gas stations $GS_N$ available within the radius of interest. Gas station list LT may have information such as the geodata (location data) of gas stations $GS_N$. One embodiment of a list LT is explained in one embodiment of FIG. 4.

To reach a specific gas station $GS_N$, a driving route may often be necessary. If a travel route is determined, a detour may often be necessary to reach a specific gas station $GS_N$. For the driving route and/or detour, a distance value D can be ascertained, which corresponds to the additional cost to reach the specific gas station $GS_N$. In determining the distance value D for each gas station $GS_N$, the distance value D may be determined from map data MD. In the embodiment of FIG. 2, the map data MD may be stored in a memory 140 (hard disk) of system 100. Alternatively, the map data MD can also be loaded from an external server via a mobile connection. In addition to the map data MD, the current geographic position X of vehicle 1 ascertained by satellite receiver 130 can be evaluated to determine the distance value D. To determine the distance value D, furthermore, the geographic position of each gas station $GS_N$ can be ascertained, wherein said geographic position in memory 140 may be stored as a POI (point of interest) and/or transmitted as part of the data Dat from database 210 via mobile network 250.

A detour from a travel route causes additional consumption not planned by the user. Driving costs CD may be based on the consumption $\Delta L_D$ of fuel G for the distance value D. The driving costs (additional consumption) can be calculated with the previously computed distance value D and fuel consumption $\Delta L_D$ by multiplying the distance value D by the fuel consumption $\Delta L_D$. The fuel consumption $\Delta L_D$ in a simple case can be a currently ascertained average consumption (e.g., in liters/100 km) of the route traveled thus far. An on-board computer of vehicle 1 can output information on the current average consumption.

In order to determine driving costs CD, the product of the distance value D and fuel consumption $\Delta L_D$ may be multiplied by a price P. The price P for the consumed fuel G may be based on the last refueling/charging operation. Alternatively, the current price P of the gas station $GS_N$ associated with the distance value D can be used for multiplication.

According to one embodiment in FIG. 2, a driver identification ID may allow a more precise prediction of the average fuel consumption from the start. There may be differences in fuel consumption up to 35% due to driving habits. The driver's identification ID may be read using an NFC (Near Field Communication) interface. This enables an optimized fuel stop management and planning.

Circuit 110 of system 110 can be configured to determine the cost of fueling CF for each gas station $GS_N$ based on the fuel amount L and a volume V of fuel tank 10 and a price P of the fuel G. The volume V of gas tank 10 can be stored in the vehicle data VD in memory 140 of system 100. The fuel amount to be filled may be determined by subtracting the present fuel amount L from the volume V. The fuel amount to be filled multiplied by the specific price P for the different gas stations $GS_N$ generates the costs CF of tank filling for each gas station $GS_N$. According to one embodiment, an on-board computer of vehicle 1 may provide the necessary fueling amount (V−L).

In one embodiment of FIG. 2, the data Dat can contain information on the current fuel prices per liter (e.g., premium, gasoline, and diesel), which can be obtained from the fuel price database 230 of the German Bundeskartellamt or another database 210. The price P may be a currently determined price P for the particular gas station $GS_N$.

The fuel price database may be provided in Germany by the Bundeskartellamt starting on the 31 of Aug. 2013. At the end of August 2013, about 14,200 gas stations in Germany are obligated to report changes in their gasoline and diesel prices at the transparency point, at the same time the price changes at the stations. Statistics could be created based on this additional information. The system may be configured to calculate the refueling operation slightly later, because gasoline prices will statistically decline at a specific time. The time-dependent statistics are stored, for example, in the additional database 210. In one embodiment of the method, the price P may be determined based on a projection. The price P in this case can be projected for the time when vehicle 1 reaches gas station $GS_N$.

According to one embodiment, price information in the database 210 may be supplemented by a price determination method. This method may have the steps:

Taking an image of a price sign of a gas station $GS_N$, for example, by a camera of the vehicle or mobile device, Recognizing the price P for the fuel G in the image of the price sign, and Sending the price P for the gas station $GS_N$ to database 210.

Prices not already provided by the German Bundeskartellamt, for example, for Super Plus, liquefied gas, hydrogen, or electric current can also be entered in database 210 by this method. In other countries as well in which no official database is made available, price information can be provided in this way in database 210.

Dual-fuel cars are vehicles that are able to use different fuels. Common combinations are:
  Diesel and electricity (plug-in hybrid)
  Gasoline and electricity (plug-in hybrid)
  Gasoline and LPG (liquefied petroleum gas)
  Gasoline and CNG (compressed natural gas)
  Gasoline and Compressed Air (hybrid)

In each case two energy sources are provided. The consequent use of the cheaper fuel must have a high priority. System 100 therefore may retrieve both prices P for both fuels for each gas station $GS_N$, if available. The cheaper energy often allows significantly shorter ranges than conventional fuels. The shorter ranges are taken into account for comfortable and user-friendly, fuel-price-driven navigation. If, for example, the cheaper fuel type and the conventional fuel type can be purchased by a refueling operation, this gas station $GS_N$ is given a higher priority in the list LT.

The total costs TC for fueling for each gas station $GS_N$ can be determined from the costs CF of the refueling operation plus the driving costs CD.

Evaluation circuit 110 of system 100 may carry out a prioritization with the use of the total costs TC. In this case, a ranking R of the gas stations $GS_N$ may be generated. The ranking R of gas stations $GS_N$ based on the total costs TC may be output to a gas station list LT. In the list LT, a gas station $GS_N$ that is along the direct route or closest can be entered at the top. The next prioritization R may be arranged based on increasing total costs TC. In addition, at least one gas station $GS_N$ from a favorites list FAV can be entered in the list LT.

The contents of the prioritized gas station list LT may be:
Total costs TC for the refueling operation,
Liter price P in € or $ of the required fuel G,
Detour/driving route D in kilometers and minutes, and/or
Geodata (location data) of the gas stations $GS_N$.

According to one embodiment, system 100 can be designed as a mobile device, for example, as a smartphone, which is suitable for a vehicle 1. System 100 may have a memory device 140 and a display 120 for displaying in vehicle 1 and a circuit 110. The circuit may have an interface for connecting to memory device 140 and display 120.

Circuit 110 may be configured to ascertain a fuel amount L in fuel tank 10 of vehicle 1. In this regard, circuit 100 can be configured to request the fuel amount L from an on-board computer of vehicle 1 via a hard-wired or wireless interface 150.

A volume V of fuel tank 10 of vehicle 1 can be stored in memory device 140. The volume V may be transmitted as a value from the on-board computer to memory 140.

Circuit 110 can be configured to read data Dat on gas stations $GS_N$ from a database 210, 230. The data Dat can have an identification of each gas station $GS_N$ and/or a geographic position of each gas station $GS_N$ and a price P, associated with the particular gas station $GS_N$, for a fuel G of vehicle 1. The data Dat may be transmitted via a wireless connection, for example, via a UMTS connection.

Circuit 110 can be configured to determine a distance value D for each gas station $GS_N$, wherein the distance value D is determined from map data MD. The map data MD are stored, for example, in memory 140 of the mobile device.

Circuit 110 can configured to up to determine driving costs CD based on a consumption $\Delta L_D$ of the fuel G for the distance value D. The consumption $\Delta L_D$ may be transmitted from the on-board computer of vehicle 1 to system 100 via an interface 150 and can be temporarily stored in memory 140 of system 100.

Circuit 110 can be configured to determine the cost of fueling CF for each gas station $GS_N$ based on the fuel amount L and the volume V and the price P of the fuel G.

Circuit 110 can be configured to determine the total costs TC for each gas station $GS_N$ based on the driving cost CD and the cost of fueling CF of the particular gas station $GS_N$.

Circuit 110 can be configured to determine a ranking R of gas stations $GS_N$ based on the total costs TC for each gas station $GS_N$ and to output it for displaying on display 120 particularly in a list LT or map display. In a map display gas stations $GS_N$ with low total costs TC may be indicated by an enlarged symbol.

Figure 3:
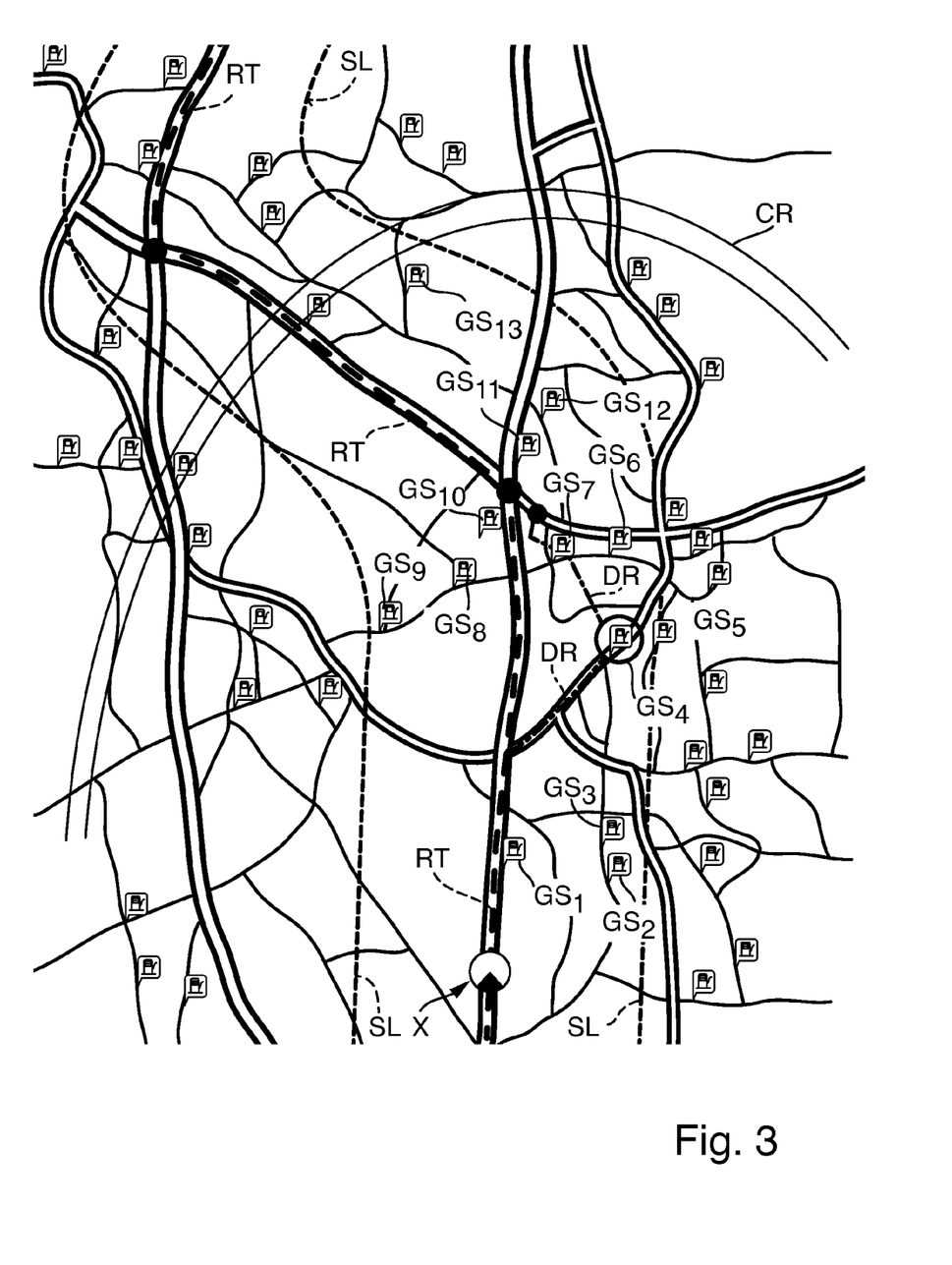
FIG. 3 shows a schematic illustration of a map.

FIG. 3

One embodiment is illustrated schematically with a map in FIG. 3. The current position X of vehicle 1 is indicated by a symbol on the map. In the method, the travel route RT from a starting point to a destination can be calculated. The travel route RT of vehicle 1 is emphasized by bold print. A corridor SL is shown along the travel route RT. The corridor SL is determined based on user editable parameters. The corridor SL may alternatively be calculated based on a maximum value for a detour DR.

Further, in one embodiment in FIG. 3, a remaining range CR is illustrated schematically by a double line. The remaining range CR may be determined based on a fuel amount L in tank 10 of motor vehicle 1.

According to one embodiment, the gas stations $GS_N$, whose data Dat are to be read, may be determined before the reading of the data Dat of the gas stations $GS_N$. The number of gas stations $GS_N$, whose data Dat are to be read, can be based on one or more variables. The determination can be based on a comparison of the distance value D of the particular gas station $GS_N$ with a threshold. This is advantageous particularly when there is no calculated travel route. The determination can be based on a remaining range CR due to the fuel amount L remaining in tank 10.

If, according to one embodiment, the vehicle's range CR falls below 100 km, an infotainment display 120 of system 100 may automatically present the selection of the three cheapest, suitable fuel stations $GS_N$ along a planned route RT. Each of the fuel stations $GS_N$ can be chosen by touch or button input. The selected gas station $GS_N$ may be integrated as an intermediate destination in the travel route RT.

In one embodiment, the determination of the number of gas stations $GS_N$, whose data Dat are to be read, may be based on a favorites set FAV of gas stations $GS_N$. The favorites set FAV may be entered by the user. Likewise, the favorites set FAV can be predetermined by a fuel card, whereby the favorites set FAV may automatically be determined based on the fuel card.

In one embodiment, the determination of the number of gas stations $GS_N$, whose data Dat are to be read, may be based on a remaining range CR, which in turn is based on a fuel amount L in tank 10 of motor vehicle 1. In addition, a safety margin can be used for the remaining range CR.

According to one embodiment, the determination of the set of gas stations $GS_N$, whose data Dat are to be read, may be based on an evaluation of previously driven routes. A travel direction can be determined from a previously driven route within a time period of, for example, five minutes. The gas stations $GS_N$, whose data Dat are to be read, may be determined based on the travel direction. According to one embodiment, the determination of the set of gas stations $GS_N$, whose data Dat are to be read, may be based on a statistical evaluation of previously driven routes. A standard route, for example, between home and work, can be inferred from a frequency of traveled routes. If vehicle 1 is on a standard route, the gas stations $GS_N$, whose data Dat are to be read, along the standard route may be ascertained.

If, according to one embodiment, no navigation is currently running, a new navigation destination may be created. The new navigation destination in this case corresponds to the geographic position of the selected gas station $GS_N$.

According to one embodiment, the distance value D can be determined based on a detour DR. The detour DR is illustrated schematically in FIG. 3 as driving route DR. The distance value D may arise from the departure from the route RT to the particular gas station $GS_N$ via detour DR. The distance value D can be determined as the route difference between the driving route DR and the travel route RT within turn-off points from the travel route RT.

According to one embodiment, a current position X of vehicle 1 can be determined. The current position X of vehicle 1 is shown by a symbol in FIG. 1. The distance value D can be determined based on a distance between the current position X and the particular gas station $GS_N$. This embodiment is especially advantageous when vehicle 1 was already started and first a refueling operation is necessary before a trip. If, when vehicle 1 is started, a fuel amount L below a minimum threshold is detected, the determination of the gas stations $GS_N$ can be started automatically.

In one embodiment in FIG. 3, the gas stations $GS_1$, $GS_2$, $GS_3$, $GS_4$, $GS_5$, $GS_6$, $GS_7$, $GS_8$, $GS_9$, $GS_{10}$, $GS_{11}$, $GS_{12}$, $GS_{13}$ within a corridor SL along the travel route RT and within the remaining range CR may be determined and shown in a map view to the driver of vehicle 1. As a departure from FIG. 3, in addition to the symbols of the gas stations $GS_1$, $GS_2$, $GS_3$, $GS_4$, $GS_5$, $GS_6$, $GS_7$, $GS_8$, $GS_9$, $GS_{10}$, $GS_{11}$, $GS_{12}$, $GS_{13}$, a price P of fuel G or a saving can be shown. A display of corridor SL and/or the remaining range CR can be faded out for greater clarity. In one embodiment, in FIG. 3 the gas station $GS_4$ may be selected by the user by means of a touch input (touch screen). The driving route DR is shown in the map view and the route guidance can occur accordingly.

Figure 4:
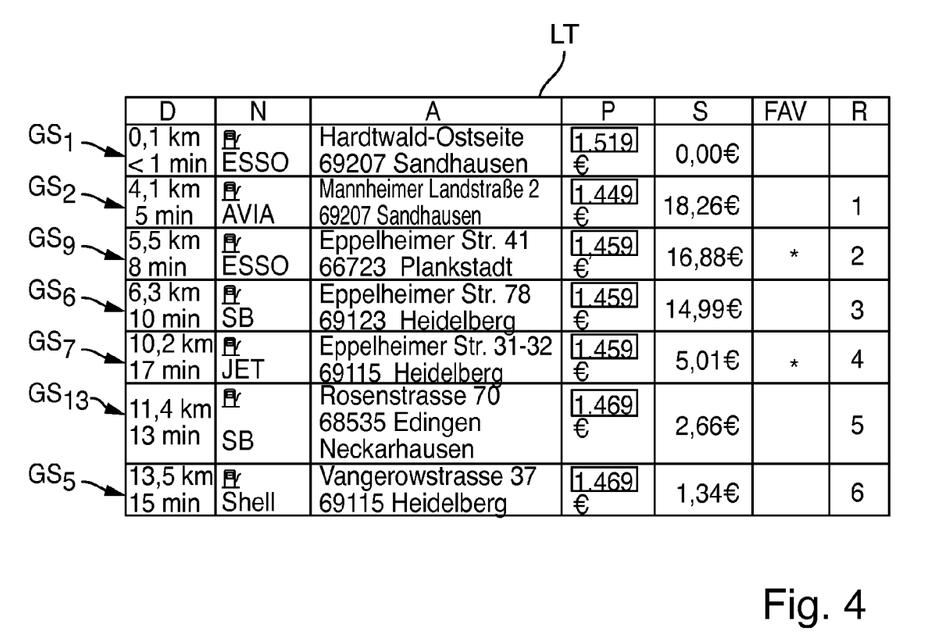
FIG. 4 shows a schematic illustration of a list.

FIG. 4

A list LT is shown schematically as a table in FIG. 4. The list LT can be output on a touch screen 120 of a vehicle 1. In one embodiment, entries for gas stations $GS_1$, $GS_2$, $GS_9$, $GS_6$, $GS_7$, $GS_{13}$, $GS_5$ may be shown in the list LT. The list LT may show for each entry a distance value D in kilometers and minutes. The list LT may show for each entry a name, particularly a brand name N of a gas station network. The list LT may show for each entry a geographic position A of the particular gas station $GS_1$, $GS_2$, $GS_9$, $GS_6$, $GS_7$, $GS_{13}$, $GS_5$ in the form of an address. The list LT may show for each entry a price P in Euros for a fuel G available for vehicle 1. The list LT may show for each entry savings S in Euros. The list LT may show for each entry whether the gas station $GS_1$, $GS_2$, $GS_9$, $GS_6$, $GS_7$, $GS_{13}$, $GS_5$ is an element of a favorites set FAV. The list LT may show a ranking R for the entries by means of numbers.

According to one embodiment, at least one gas station $GS_9$, $GS_7$ can be determined from a favorites set FAV. Gas stations $GS_9$, $GS_7$ from the favorites set FAV can be shown in addition in the list and optionally emphasized. The list LT may contain at least one entry for a gas station $GS_9$, $GS_7$ from the favorites set FAV. It is also possible that the list LT has only entries with gas stations $GS_9$, $GS_7$ from the favorites set FAV.

In the embodiment of FIG. 4, seven options can be selected as the station destination, for example, by touching the row on touch screen 120. The option can be output to the driver. According to one embodiment, a gas station $GS_1$ with the lowest driving cost CD and/or the lowest distance value D can be determined. The gas station $GS_1$ with the lowest driving cost CD and/or the lowest distance value D may be shown in addition in the list LT. In one embodiment of FIG. 4, the gas station $GS_1$ with the lowest driving cost CD and/or the lowest distance value D may be shown as an extra entry in the list LT.

Six options may be the priorities one to six of the prioritized gas stations $GS_2$, $GS_9$, $GS_6$, $GS_7$, $GS_{13}$, $GS_5$. The topmost entry may show the gas station $GS_1$ with the lowest distance value D, which therefore causes the shortest detour from the travel route RT.

According to one embodiment, an entry of a selection of a gas station $GS_1$, $GS_2$, $GS_9$, $GS_6$, $GS_7$, $GS_{13}$, $GS_5$ may be determined from the list LT. The input of the selection may be made by a user, particularly the driver of motor vehicle 1. Next, a driving route DR to geographic position A of the selected gas station can be calculated. Geographic position A of the selected gas station may be included as a destination or intermediate destination in the route calculation. Next, a route guidance for the driving route DR can be output.

Alternatively to displaying the savings S based on gas station $GS_1$, the total costs TC can also be output (not shown in FIG. 4). In this regard, a list LT with the ranking R of gas stations can be output, wherein the total costs TC for each gas station may be shown in the list LT.

The invention is not limited to the shown embodiments in FIGS. 1 to 4. For example, it is possible to also indicate the savings for each gas station in the map display of FIG. 3. Likewise, it is possible to configure the list LT different from a table in FIG. 4 or to provide a combination of table view and a map view. A system 100 according to FIG. 2 is preferably implemented in an infotainment system of a motor vehicle 1.

To enable a true and complete cost-based calculation of possible fuel stops and the efficiency of the necessary detours DR, system 100 may access a database with real maintenance costs as a basis of calculation. The inclusion of the real costs will, however, lead to a significant number of gas stations. This option is advantageous for fleet customers who are interested in actual cost reductions. For all other customers the calculation of the purchase price P versus the driven detour DR will probably be suitable. To inform the driver the vehicle information system may provide:

Current fuel consumption,
Average fuel consumption,
Remaining fuel,
Average speed,
Outside temperature.

The outside temperature significantly influences the fuel consumption especially during short trips. The use of this information reduces the overall cost. A screen-based, fully programmable instrument cluster display could provide essential information to the driver to make his trip as fuel/range-efficient as possible, thus making the fuel-price-based navigation a truly green solution as well. To be displayed are optically visualized rotations per minute and speed recommendations based on the actual driving situation and operational state.

The system may be implemented as an app running on a mobile device. The app allows a number of statistical analyses apart from numerous calculation presets, such as strictly range-optimized or strictly consumption-optimized or strictly cost-optimized. Embodiments of the statistical analysis include a log book, including refueling stops, fuel consumption, and/or cost savings.

LIST OF REFERENCE CHARACTERS

1 Vehicle
10 Fuel tank, tank
100 System
110 Circuit
120 Display
130, GPS GPS, satellite receiver
140, MEM Memory
150, I/O Interface
160; TRX Transceiver
210 Database
220 Internet
230 Public database
250 Mobile network
Dat Data
$GS_N$ Gas station
$GS_1$, $GS_2$, $GS_3$, $GS_4$, Gas station
$GS_5$, $GS_6$, $GS_7$, $GS_8$,
$GS_9$, $GS_{10}$, $GS_{11}$, $GS_{12}$, GS₁₃
CR Range
RT Travel route
DR Detour
X Current position
G Fuel
L Fuel amount, fueling amount, charge
V Volume, storage volume, capacity
P Price
$\Delta L_D$ Consumption, fuel consumption
D Distance value
CF Cost of fueling
CD Driving cost
TC Total cost
R Ranking
LT List
FAV Favorites
MD Map data
VD Vehicle data
S Savings
A Geographic position, Geodata
N Name, Brand

What is claimed:

1. A method for providing information in a vehicle, comprising:
   Outputting a fuel amount in the fuel tank of the vehicle,
   Outputting a volume of the fuel tank of the vehicle,
   Reading data on gas stations from a database, wherein the data have an identification for each gas station and/or a geographic position of each gas station and wherein the data have a price associated with the particular gas station for a fuel for the vehicle,
   Determining a distance value for each gas station, wherein the distance value is determined from map data,
   Determining driving cost based on consumption of the fuel for the distance value,
   Determining cost of fueling for each gas station based on the fuel amount and the volume and the price of the fuel,
   Determining total cost based on the driving cost and the cost of fueling, and
   Visually outputting a ranking of gas stations based on the total cost.

2. The method according to claim 1, wherein visually outputting a ranking comprises:
   Displaying a list with the ranking of gas stations, wherein the total cost for each gas station and/or savings for each gas station are displayed in the list.

3. The method according to claim 2, wherein each entry in the list has a time difference based on the distance value.

4. The method according to claim 2, comprising:
   Identifying a gas station with the lowest driving cost and/or the lowest distance value, and
   Displaying in addition the gas station with the lowest driving cost and/or the lowest distance value in the list.

5. The method according to claim 2, comprising:
   Identifying at least one gas station from a favorites set, and
   Displaying in addition the at least one gas station from a favorites set in the list or,
   Displaying only gas stations from the favorites set in the list on the ranking.

6. The method according to claim 1, comprising:
   Detecting an input of a selection of a gas station from the list by a user,
   Calculating a driving route to the geographic position of the selected gas station, and
   Outputting a route guidance for the driving route.

7. The method according to claim 1, comprising:
   Calculating a route from a starting point to a destination, and
   Determining the distance value based on a detour which arises due to the departure from the route to the particular gas station.

8. The method according to claim 7,
   wherein the starting point is based on the current position of the vehicle, and/or
   wherein the destination is based on a user input, and/or
   wherein the destination is based on a recorded history of driven ways.

9. The method according to claim 7, comprising:
   Monitoring the fuel amount in the fuel tank, and
   Initiating the calculation of the route, if fuel the amount in the fuel tank falls below a threshold.

10. The method according to claim 1, comprising:
    Determining a current position of the vehicle, and
    Determining the distance value based on a distance between the current position and the particular gas station.

11. The method according to claim 1, comprising:
    Determining the gas stations whose data are to be read, before the reading of the data of the gas stations, the determination being particularly based on
    a comparison of the distance value of the particular gas station with a threshold, and/or
    a remaining range based on the fuel amount, and/or
    a favorites set of gas stations, and/or
    a match between at least one fuel under offer of the particular gas station and the fuel suitable for the vehicle.

12. The method according to claim 1,
    wherein the total cost of one rank is calculated based on at least two distance values for reaching at least two gas stations and at least two data of the at least two gas stations,
    wherein an entry of the one rank is displayed having the at least two gas stations.

13. The method according to claim 1, comprising:
    Taking an image of a price sign of a gas station,
    Detecting the price for the fuel in the image of the price sign, and
    Sending the price for the gas station to the database.

14. The method according to claim 1, comprising:
    Determining a time dependency of change of a fuel price for each gas station based on a history of the fuel price, and
    Determining the price associated with the particular gas station for the fuel based on a forecast using the determined time dependency.

15. A system for providing information for a vehicle, comprising:
    a memory device,
    a display for displaying in the vehicle,
    a circuit, which has an interface for connecting to the memory device and the display,
    wherein the circuit is configured to determine a fuel amount in the fuel tank of the vehicle,
    wherein a volume of the fuel tank of the vehicle is stored in the memory device,
    wherein the circuit is configured to read data on gas stations from a database, wherein the data have an identification for each gas station and/or a geographic position of each gas station and wherein the data have for each gas station a price associated with the particular gas station for a fuel for the vehicle, wherein the circuit is configured to determine a distance value for each gas station, whereby the distance value can be determined from map data,
wherein the circuit is configured to determine driving cost based on a consumption of the fuel for the distance value,
wherein the circuit is configured to determine cost of fueling for each gas station based on the fuel amount and the volume and the price of the fuel,
wherein the circuit is configured to determine total cost based on the driving cost and the cost of fueling, and
wherein the circuit is configured to determine a ranking of gas stations based on the total cost and to visually output the ranking of gas.

* * * * *